M. FELDMAN.
CLOTHES RACK.
APPLICATION FILED SEPT. 20, 1920.
Reissued Feb. 8, 1921. 15,037.
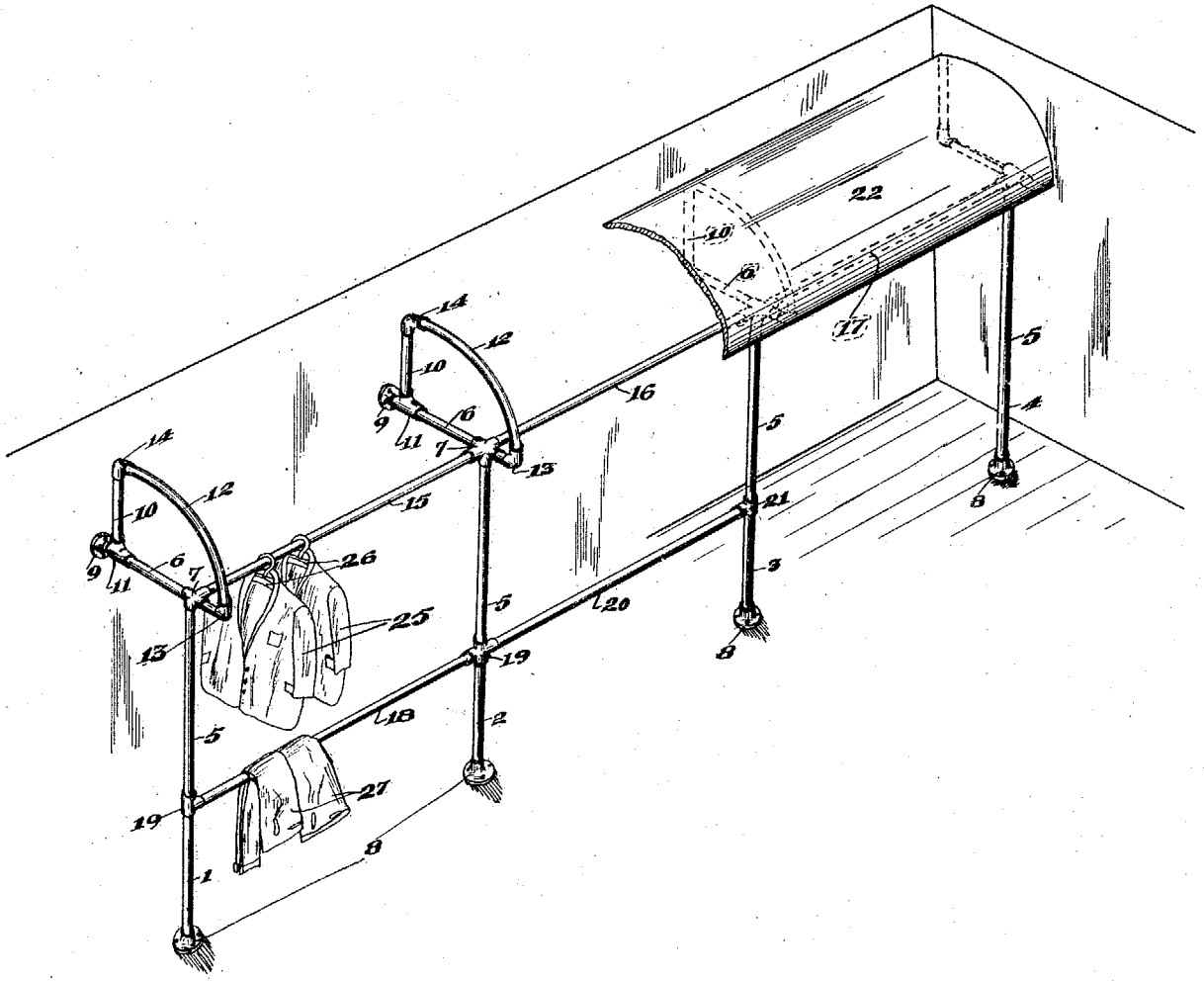
INVENTOR
Morris Feldman
by Hazard & Miller
Att'ys

UNITED STATES PATENT OFFICE.

MORRIS FELDMAN, OF LOS ANGELES, CALIFORNIA.

CLOTHES-RACK.

15,037. Specification of Reissued Letters Patent. Reissued Feb. 8, 1921.

Original No. 1,350,017, dated August 17, 1920, Serial No. 372,098, filed April 7, 1920. Application for reissue filed September 20, 1920. Serial No. 411,662.

*To all whom it may concern:*

Be it known that I, MORRIS FELDMAN, a citizen of the United States, residing at Los Angeles, in the county of Los Angeles and State of California, have invented new and useful Improvements in Clothes-Racks, of which the following is a specification.

My invention is an improved clothes rack particularly useful in tailor shops, and consists of the novel features hereinafter described and shown in the annexed drawing which forms a part of this specification.

Referring to the drawing the figure is a perspective view of my invention.

In the drawing, 1, 2, 3 and 4 indicate standards spaced a suitable distance apart adjacent a wall of a room. Each standard includes an upright 5 and a transverse member 6 connected to the upper end of said upright by a joint 7. The lower end of each upright 5 is mounted in a base 8 which is secured to the floor.

The inner end of each transverse member 6 is mounted in a base 9 secured to a vertical wall of a room. A vertical member 10 is connected to the inner end of each transverse member 6 by a joint 11 and extends upwardly from said transverse member. Each transverse member 6 extends forwardly a short distance from the upright 5 to which it is connected, and an arched rafter 12 is connected at its lower end by a joint 13 to the forward end of each transverse member 6 and at its upper end to the upper end of a vertical member 10 by means of a joint 14.

A horizontal rail 15 is connected by joints 7 at its ends to the upper end of the uprights 5 of the standards 1 and 2. A horizontal rail 16 is connected at its ends by joints 7 to the upper end of uprights 5 of the standards 2 and 3. A horizontal rail 17 is connected at its ends by joints 7 to the upper ends of the uprights 5 of the standards 3 and 4. A rail 18 is connected at its ends by joints 19 to the uprights 5 of the standards 1 and 2 about one-third of the distance from the lower end to the upper end of said uprights or about two and one-half feet above the floor. A rail 20 is likewise connected at its ends to the upright 5 of the standard 2 by a joint 19 and at its other end to the upright 5 of the standard 3 by a joint 21 at the same level as the rail 18. An arched roof 22 rests upon the rafters 12.

Coats 25 are hung on the rails 15 and 16 by means of the usual coat hangers 26 and trousers 27 are hung over the rails 18 and 20 in which position they are exposed to view and protected by the roof 22 from falling dust. Long coats may be hung on the rail 17.

Various changes may be made without departing from the spirit of the invention as claimed.

What is claimed is:

1. A clothes rack including a plurality of standards each standard comprising an upright mounted on the floor, a transverse member connected to the upper end of said upright and connected at its inner end to a vertical wall, and rafters; a roof resting upon said rafters; a rail connecting each adjacent pair of standards at the upper end of their uprights upon which coats may be hung; and a rail connecting the uprights of each adjacent pair of standards about one-third the distance from the lower to the upper ends of said uprights upon which rails trousers may be hung.

2. A clothes rack comprising a plurality of vertical standards having bases, a longitudinal member connecting the tops of said standards, a second longitudinal member connecting said standards intermediate said first named member and their bases transversely horizontal, disposed members secured adjacent the tops of said standards extending on either side of the uppermost longitudinal member, one extremity of said members adapted to be secured to a wall, arcuate rafters supported on said transverse members and an arcuate roof supported on said rafters.

3. A clothes rack comprising a plurality of vertical standards, a longitudinal member connecting the upper ends of said standards and adapted for supporting coat hangers, transverse members supported by said standards and extending on either side of the longitudinal member, roof rafters supported on said transverse members, and a roof supported on said rafters.

In testimony whereof I have signed my name to this specification.

M. FELDMAN.